United States Patent

[11] 3,628,763

| [72] | Inventor | Adolf Auer |
| | | Munich, Germany |
| [21] | Appl. No. | 817,676 |
| [22] | Filed | Apr. 21, 1969 |
| [45] | Patented | Dec. 21, 1971 |
| [73] | Assignee | Bremshey Aktiengesellschaft |
| | | Solingen, Germany |

[54] AIR-SPRUNG SEAT FOR VEHICLES
5 Claims, 1 Drawing Fig.

[52] U.S. Cl. .................................................. 248/400
[51] Int. Cl. .................................................. A47c 3/30
[50] Field of Search .......................................... 248/400,
376; 16/66; 267/65, 65 A, 65 D, 113, 118,
120–124, 117

[56] References Cited
UNITED STATES PATENTS

| 598,186 | 2/1898 | Thompson .................. | 248/400 |
| 3,302,940 | 2/1967 | Wain ........................... | 267/126 |
| 3,405,901 | 10/1968 | Gregoire ..................... | 248/400 |

*Primary Examiner*—Edward C. Allen
*Attorney*—Finkelstein & Mueth

ABSTRACT: A novel air-sprung vehicle seat, characterized by a piston arranged in slidable form in the air spring piston or in an auxiliary chamber, for altering the volume of air in the air spring, and therewith the inherent frequency of the seat.

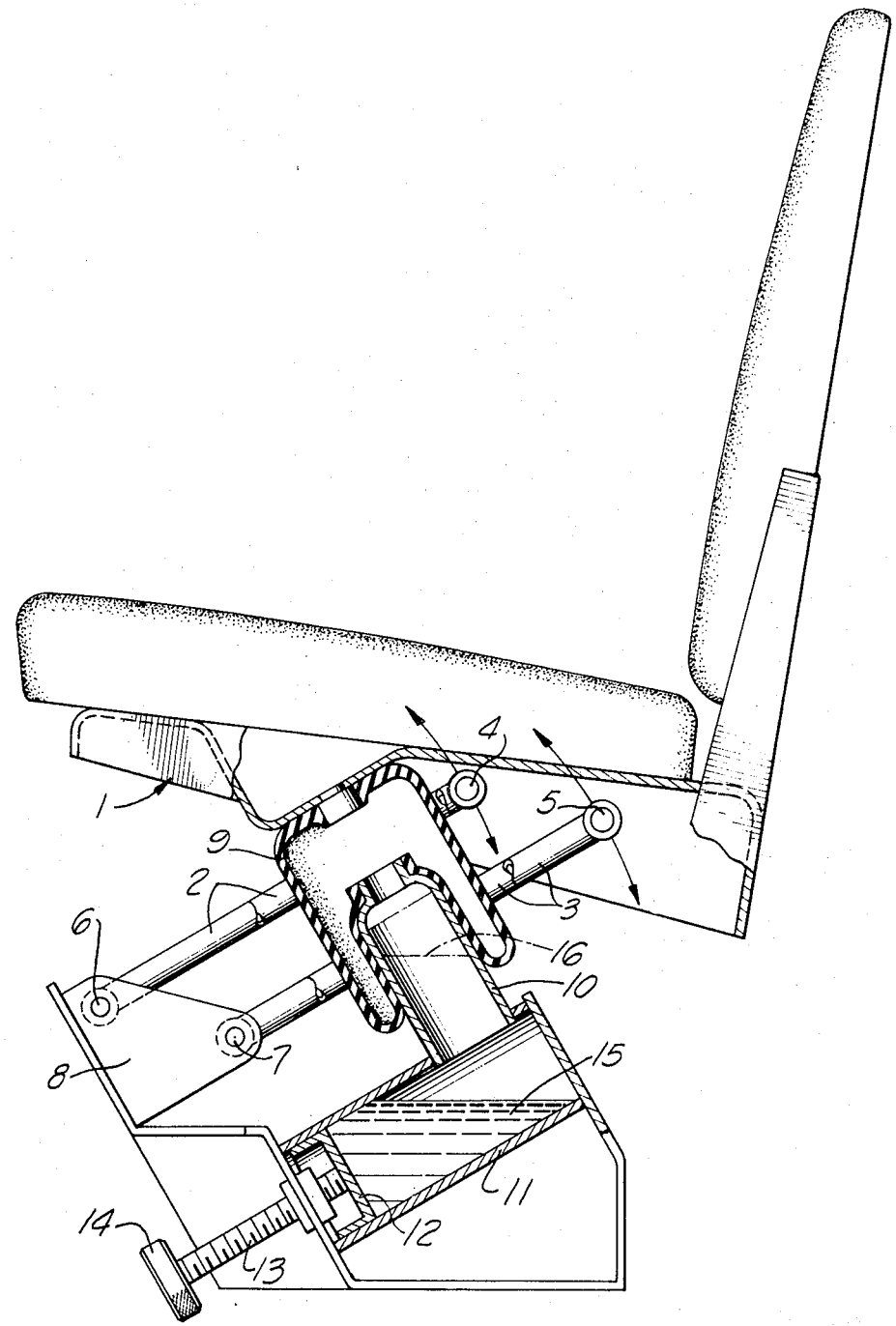

AIR-SPRUNG SEAT FOR VEHICLES

BACKGROUND OF THE INVENTION

It has been previously proposed that the frequency of a sprung vehicle seat be effected mechanically by a rocker arm. In the present application, the volume of the air spring, and therewith the inherent frequency, are changed.

SUMMARY OF THE INVENTION

Briefly, the present invention comprises an air-sprung vehicle seat, characterized by a piston arranged in slidable form in the air spring piston or in an auxiliary chamber, for altering the volume of air in the air spring, and therewith the inherent frequency of the seat.

DESCRIPTION OF PREFERRED EMBODIMENTS

The drawing shows a side view of a vehicle seat with the air spring, and also the arrangements for changing the inherent frequency, shown partly in cross section.

The seat frame 1 is held rotatably by two pair of guide rods 2 and 3. The upper guide rod eyelets 4 and 5 are secured to the seat frame, and the lower guide rod eyelets 6 and 7 are fastened to bearing frame 8, so that said eyelets 4 and 5 described the curves drawn in during the upwards and downwards oscillations of the seat.

The air spring bellows or container 9 is fastened airtight above at the seat frame; the air spring piston 10 is secured airtight to cylinder 11. The last-named contains a piston 12 arranged in sliding form and shown in its furthest position.

By turning spindle screw 13 by means of handwheel 14, the piston is moved and thereby the volume of the air spring is reduced without steps.

The example illustrated shows a fluid 15 between the pistons and compressed air, and the level of the said fluid after complete movement of the piston is shown by 16. By changing the quantity of the fluid, the range of the inherent frequency values can be adapted to the particular conditions. Instead of the piston, a "rolling bag" with fixed bottom can also be arranged.

Changing the characteristics of air springs by connecting and disconnecting auxiliary chambers is known. In the example shown, however, a stepless adjustment is provided as already explained above.

Having fully described the invention, it is intended that it be limited only by the lawful scope of the appended claims.

1. A pneumatically sprung seat for vehicles comprising a seating surface, said seating surface being borne by a seat frame, said seat frame being carried by an air-spring unit that is variable in its springing force, said air-spring unit comprising a first chamber having a constant volume of air, said first chamber being open at each end, the upper end of said chamber communicating with a second chamber, said second chamber being airtight and having deformable walls, said second chamber being attached at one end to said seat frame and the other end being attached to said first chamber, said second chamber being adapted to increase and decrease in volume in accordance with the movement caused by weight applied to said seating surface, the other end of said first chamber communicating with an airtight fluid chamber adapted to receive a body of liquid and a volume of air above said body of liquid communicating with the interior of said first chamber, said fluid chamber being provided with a piston, means to adjust and maintain the position of said piston to vary the volume of said chamber and thereby regulate the compression space of the air above the liquid in said fluid chamber.

2. The seat of claim 1 wherein said fluid chamber is affixed to and rests on a bearing frame.

3. The seat of claim 2 wherein said seat frame is guided by a pair of guide rods each rotatably connected at one end to said seat frame and at the other end to said bearing frame.

4. The seat of claim 1 wherein said means to adjust and maintain the position of said piston is a screw spindle.

5. The seat of claim 1 wherein said seat also has a backrest rising at essentially right angles to said seating surface.

* * * * *